Nov. 19, 1935.  H. BERG  2,021,349

BORING BAR TOOL SUPPORT

Filed April 20, 1932

Inventor
HERMAN BERG
By Richey & Watts
Attorneys

Patented Nov. 19, 1935

2,021,349

UNITED STATES PATENT OFFICE 2,021,349

BORING BAR TOOL SUPPORT

Herman Berg, Cleveland, Ohio, assignor to The Kelley Reamer Company, Cleveland, Ohio, a corporation of Ohio Application April 20, 1932, Serial No. 606,433

3 Claims. (Cl. 77—56)

This invention relates to reamers or boring tools, and more specifically to improvements in the mechanism for supporting and retaining the cutting tools in bars of the type which are organized to facilitate the adjustment and removal of the cutter from the bar.

It is desirable in machine tool practice to employ a cutting tool which may be adjusted with micrometerical precision in the boring bar within which it is mounted and to be able to remove the cutters, from time to time, for the purpose of grinding and thereafter to reposition the cutter within the bar without alteration of the former adjustment of the cutter blade.

Various expedients have been successfully employed to facilitate the adjustability or centralization of the cutters with respect to the axis of the bar, but the utility of such adjustment has been defeated in certain of these devices due to the translation of movement from the locking device to the tool during the clamping event.

One of the objects of this invention, therefore, is to provide a tool locking device which may be manipulated to secure the cutting tool or holder within the boring bar without shifting or otherwise impairing the centralized adjustment thereof.

Another object of this invention is to provide a cutting tool which may be adjusted in relation to the axis of the boring bar and mechanism associated therewith to effect the desired frictional resistance and support while the adjustment is being made.

Another object of this invention is to provide a clamping member for a floating reamer or the like which is self-sustained within the boring bar and adaptable for use in retaining either an adjustable or floating cutting tool.

Another object of this invention is to provide a tool clamping device which is durable, interchangeable with respect to boring bars of similar proportions capable of ready adjustment and economic of manufacture.

Other objects and advantages more or less ancillary to the foregoing, reside in the specific construction and aggroupment of elements peculiar to the structure, as will become apparent from a more complete examination of this specification, in the claims whereof there are assembled certain combinations of parts and structure indicative of the scope and spirit of this invention.

In the drawing, which illustrates a preferred embodiment of this invention—

Figure 1:
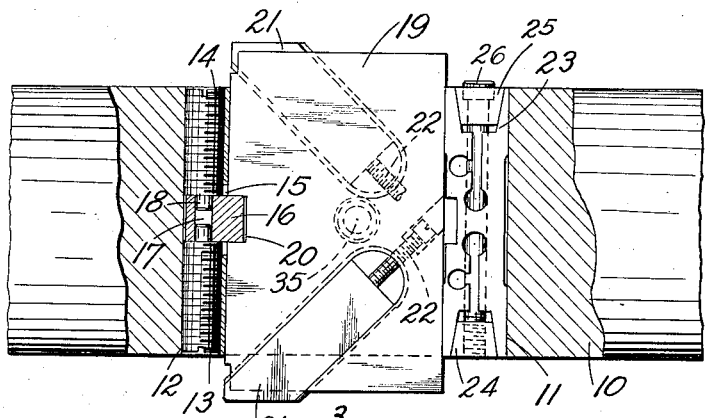
Figure 1 is an elevational view partially in section of a portion of a boring bar embodying the present invention.

Referring to the drawing and particularly to Figure 1 thereof, the improved boring tool comprises a bar 10 having a rectilinear slot 11 therein, the major axis thereof being in co-axial relation with the bar. Adjacent the slot 11 there is a threaded bore 12 in which there is mounted adjusting screws 13 and 14. The wall of the bar 10 intermediate the slot 11 and the bore 12 is centrally apertured with a slot 15 to receive a guide block or tongue 16. This tongue is formed with an aperture 17 in the central portion thereof which is provided to receive the shank end portions 18 of the adjusting screws 13 and 14. The slot 15 is of suitable width with respect to the tongue 16 to accommodate diametric adjustments of the tongue within the boring bar.

For the purpose of illustration, the cutting tool shown herein embodies a tool block 19 provided with a notch 20 in the forward edge thereof which is formed to snugly engage the tongue 16. The tool bits or cutters 21 may be retained within the block 19 in any suitable manner, such as through the dove-tail connection shown, and may be adjusted radially with respect to the axis of the boring bar by the set screws 22. The slot 11 is formed to permit the clamping member 23 to be assembled intermediate the end wall of the slot and the tool block 19. The proportions of the clamp and tool block being organized to fit snugly within the slot when the clamp is in its unstressed form.

The clamp 23 comprises a block bored throughout its major axis and formed with bifurcated ends, the inner walls of which converge centrally to form tapered seats into which there are fitted wedge blocks 24 and 25. The block 24 is drilled and tapped to receive a draw bolt 26, which extends through the body of the clamp and is retained by the block 25 through the engagement of the headed portion of the bolt within a counter bored seat 27 in the outer end of the wedge. The face of the wedge block 25 is formed with a slot 28 into which a guide pin 29 is fitted to retain the wedge laterally upon its seat and prevent accidental separation of the respective parts of the assembly.

The block 23 is formed with a plurality of transversely disposed openings 30 having kerfs 31 communicating therewith which are arranged to govern the flexibility of the end portions of the walls of the body. A notch 32 formed for the reception of the tongue 16 is provided in the forward face of the block and is employed when the clamp is positioned to retain the tool mounted as a sizing or floating cutter. Adjacent the head of the draw bolt 26 there is an annular groove 33 which retains a split spring 34 forming a stop collar to restrain the longitudinal movement of the bolt when the wedge 24 is retracted from its seat.

The boring bar is provided with a set screw 35 which is disposed in one of the walls adjacent the slot 11. The end of this screw is formed to provide a detent coordinated for engagement with a recess 36 in the face of the tool holder 19 to loosely support the cutter within the bar and prevent its accidental removal therefrom.

In operation the cutting tool is mounted in the boring bar 10 with the clamping block in juxtaposition therewith. Centralization of the cutting tool is effected by the position of the tongue 16 or may be varied if necessary by suitably adjusting the screws 13 and 14. The draw bolt 26 is then manipulated to effect the retractile movement of the wedge blocks 24 and 25 upon their seats, thus expanding the end portions of the block and causing the cutter 19 to be compressively held against the end wall of the slot 11.

Figure 2:
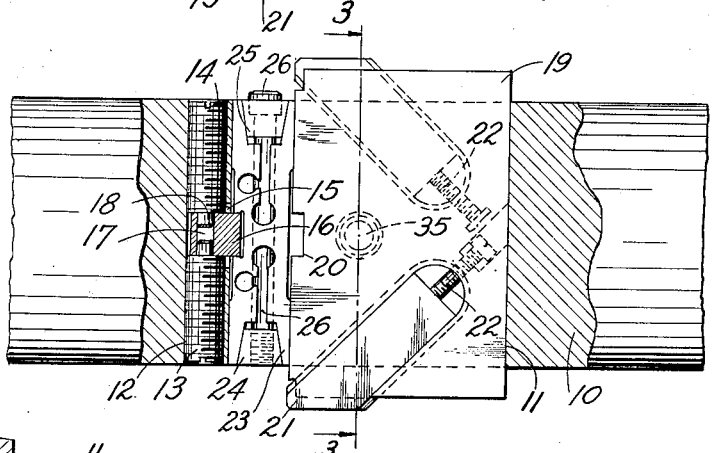
Figure 2 is a similar view illustrating an alternate application of the clamping member embodying this invention.
Figure 3:
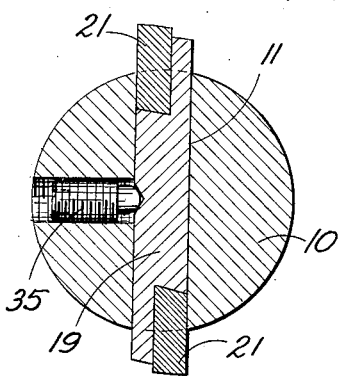
Figure 3 is a transverse sectional view of the bar and cutting tool, the view being taken on a plane indicated by the line 3—3 of Figure 2.
Figure 4:
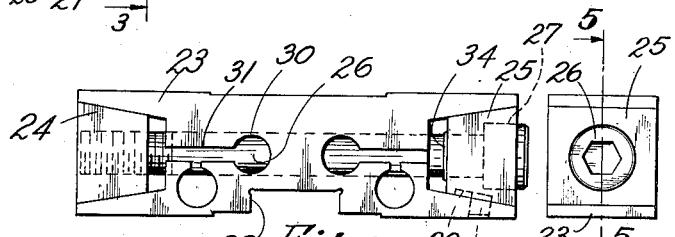
Figure 4 is an elevational view of the tool clamping member.
Figure 6:
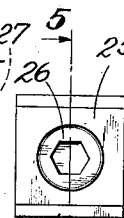
Figure 6 is an end elevational view of the device shown in Figure 4.
Figure 5:
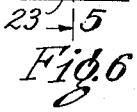
Figure 5 is a longitudinal sectional view of the device shown in Figure 4.

As illustrated in Figure 2 the clamping member is arranged to retain a floating or sizing reamer. In this assembly the notch 32 in the block 23 is engaged with the tongue 16 of the adjusting mechanism in the boring bar and the cutting tool is mounted behind the clamp and adjacent thereto. By adjusting the draw bolt 26 and thus expanding the block 23 the cutting tool may be suitably supported under the desired compressive engagement.

Although the foregoing description is necessarily of a detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

I claim:

1. A boring bar having a slot therethrough, a tool block mounted therein, cutters mounted in said tool block, screws in said tool block disposed in abutting relation with the cutters to facilitate the adjustment thereof, a tongue mounted in said boring bar, a portion thereof extending within the said slot and arranged for transaxial adjustment therein relative to the boring bar, adjusting screws mounted in said bar and engageable with said tongue, the said tool block having a recess in the marginal edge thereof for receiving said tongue, a clamp mounted in said slot intermediate the end wall thereof and the tool block, said clamp comprising a body having inwardly tapered recesses in the free ends thereof and a bore extending axially therethrough, pyramidal wedge blocks in the said recesses, a draw bolt within the bore in said clamp and having threaded engagement with one of said blocks, a head formed upon said draw bolt arranged for engagement with the other of said wedges, the width of said clamp being greater than the height of said tongue in order to facilitate disengagement of the tool block from the tongue upon removal of said clamp.

2. A boring bar having a slot therethrough, a tool block mounted therein, cutters mounted in said tool block, screws in said tool block disposed in abutting relation with the cutters to facilitate the adjustment thereof, a tongue mounted in said boring bar, a portion thereof extending within the said slot and arranged for transaxial adjustment therein relative to the boring bar, adjusting screws mounted in said bar and engageable with said tongue, the said tool block having a recess in the marginal edge thereof for receiving said tongue, a clamp mounted in said slot intermediate the end wall thereof and the tool block, said clamp comprising a body having inwardly tapered recesses in the free ends thereof and a bore extending axially therethrough, pyramidal wedge blocks in the said recesses, a draw bolt within the bore in said clamp and having threaded engagement with one of said blocks, a head formed upon said draw bolt arranged for engagement with the other of said wedges, means to limit the retractive movement of one of said wedges from the clamp and means to effect the retention of one of the wedges upon said bolt.

3. A boring bar having a slot therethrough, a tool block mounted therein, cutters mounted in said tool block, a tongue mounted in said boring bar and extending within said slot, said tool block having a recess therein adapted for engagement with said tongue, and an expansible clamp assembly disposed within said slot intermediate the end wall thereof and in abutting relation with said tool block; said assembly comprising an elongated expansion block having tapered wedge-shaped seats in the free ends thereof, wedge blocks mounted in said seats and being normally clear of the bottom of the seats to permit a sliding wedge action of the wedge blocks, and a draw bolt extending through said expansion block and connected at its opposite ends to said wedge blocks to provide simultaneous adjustment of the latter and simultaneous expansion and contraction of said expansible block, the body of the latter block being of greater width than the height of the tongue and freely removable from the slot when in its unexpanded adjustment.

HERMAN BERG.